United States Patent [19]

Nozawa et al.

[11] Patent Number: 4,629,956
[45] Date of Patent: Dec. 16, 1986

[54] SYSTEM FOR CONTROLLING MOTORS FOR SYNCHRONOUS OPERATION

[75] Inventors: Ryoichiro Nozawa, Tokyo; Yoichi Amemiya; Hideaki Kawamura, both of Hachioji, all of Japan

[73] Assignee: Fanuc Ltd, Minamitsuru, Japan

[21] Appl. No.: 808,811

[22] Filed: Dec. 13, 1985

Related U.S. Application Data

[63] Continuation of Ser. No. 433,622, Oct. 8, 1982.

[30] Foreign Application Priority Data

Oct. 9, 1981 [JP] Japan .................................. 56-161241

[51] Int. Cl.[4] ............................................. G05B 11/32
[52] U.S. Cl. ..................................... 318/625; 318/616
[58] Field of Search ............... 318/625, 606, 415, 616, 318/636

[56] References Cited

U.S. PATENT DOCUMENTS 3,838,325 9/1974 Kobayashi et al. ................. 318/415

Primary Examiner—William M. Shoop, Jr.
Assistant Examiner—Saul M. Bergmann
Attorney, Agent, or Firm—Staas & Halsey

[57] ABSTRACT

There is disclosed a system for controlling a plurality of motors including a spindle motor of a machine tool to rotate synchronously at command speeds. The system comprises a numerical control unit for generating as positional commands trains of distributed pulses having frequencies corresponding to commanded speeds of rotation respectively for the motors, positional control feedback circuits respectively for the motors for producing speed command outputs from the trains of distributed pulses and detected signals indicative of positions of the motors, and speed control feedback circuits respectively for the motors for controlling the speed of the motors based on the speed command outputs and detected signals indicative of speeds of rotation of the motors.

3 Claims, 4 Drawing Figures

SYSTEM FOR CONTROLLING MOTORS FOR SYNCHRONOUS OPERATION

This application is a continuation application of U.S. Ser. No. 433,622, filed on Oct. 8, 1982.

BACKGROUND OF THE INVENTION

The present invention relates to a system for controlling a spindle motor and other motor or motors of a machine tool or the like for their synchronous operation, and more particularly to a system for controlling motors for synchronous operation which is suitable for use with a gear hobbing machine, a gear grinder, an engine lathe or the like in which two or more motors are required to rotate synchronously for gear cutting, gear grinding, thread cutting or the like.

Machine tools such as gear hobbing machines, engine lathes and the like cut gears and threads by rotating two or more motors including a spindle motor in synchronism. For example, it is necessary for gear cutting on a gear hobbing machine that a hob and a workpiece be rotated in complete synchronism. No high-precision gear cutting would be possible if the motors were rotated out of synchronism. More specifically, it is general practice for a hob shaft to make exactly one revolution while the workpiece is moving one pitch to cut a gear tooth on the workpiece. If the hob shaft and the workpiece rotate out of snychronism, then various cutting errors are caused which include a curved gear tooth, a varied gear pitch, and the like. For gear cutting on an engine lathe, it is necessary to bring the speeds of rotation of a workpiece on the spindle and a cutting tool into complete synchronism. If the workpiece and the cutting tool do not rotate synchronously, then gear teeth cannot be cut to a nicety. More specifically, the cutting tool moves one pitch while the workpiece makes one revolution. When the cutting tool moves out of synchronism with the rotation of the workpiece, the gear pitch is caused to vary thus resulting in a cutting error.

It has been customary in providing the synchronized motor operation to rotate a reference motor or spindle motor at a given commanded speed, attach a pulse coder to the reference motor for generating a pulse each time the motor rotates through a predetermined angle, and rotate another motor in synchronism with the pulse thus generated. More specifically, when the reference motor under the control of the commanded speed rotates at a speed of $Vm_1$, the speed of the pulse is proportional to the motor speed $Vm_1$, that is, $kVm_1$. The speed $Vm_1$ of rotation of the reference motor is detected, and the ratio of a speed $Vm_2$ of rotation of the other motor to the speed $Vm_1$ is determined. Data on the ratio $Vm_2/Vm_1$ and the pulse having the pulse speed $kVm_1$ are supplied to a pulse rate multiplier for multiplication. Then, the pulse rate multiplier produces a train of pulses having a pulse speed of $kVm_2$, which is utilized to control the other motor to rotate in synchronism with the reference motor.

With the conventional system for controlling motors for synchronous operation, however, each motor is given a speed command, and hence only a spped control loop can be employed. This has led to the disadvantages in that the motor cannot readily restore its rotation at a commanded speed when its actual speed of rotation varies, and the speed of rotation of the spindle motor can easily change with a variation in the motor load. Furthermore, when the speed of rotation of the spindle motor varies due to a load variation or the difference in load between rough machining and final finishing of a workpiece, the amount of delay of operation of each motor tends to change as the speed command for the other motor is derived from the speed of rotation of the spindle motor, thereby lowering a cutting accuracy to a large degree.

SUMMARY OF THE INVENTION

It is an object of the present invention to provide a system for controlling two or more motors including a spindle motor for exact synchronous operation.

Another object of the present invention is to provide a synchronous operation control system capable of synchronous operation of motors which is highly speed-responsive.

Still another object of the present invention is to provide a synchronous operation control system having an increased speed restoring capability to bring the actual speed of rotation of each motor immediately into conformity with a commanded speed when the actual speed has varied from the commanded speed due to a variation in the load.

According to the present invention, there is disclosed a system for controlling a plurality of motors including a spindle motor of a machine tool to rotate synchronously at command speeds. The system comprises a numerical control unit for generating as positional commands trains of distributed pulses having frequencies corresponding to commanded speeds of rotation respectively for the motors, positional control feedback circuits respectively for the motors for producing speed command outputs from the trains of distributed pulses and detected signals indicative of positions of the motors, and speed control feedback circuits respectively for the motors for controlling the speed of the motors based on the spped command outputs and detected signals indicative of speeds of rotation of the motors.

Other features and advantages of the invention will be apparent from the following description taken in connection with the accompanying drawings.

DESCRIPTION OF THE PREFERRED EMBODIMENTS

Figure 1:
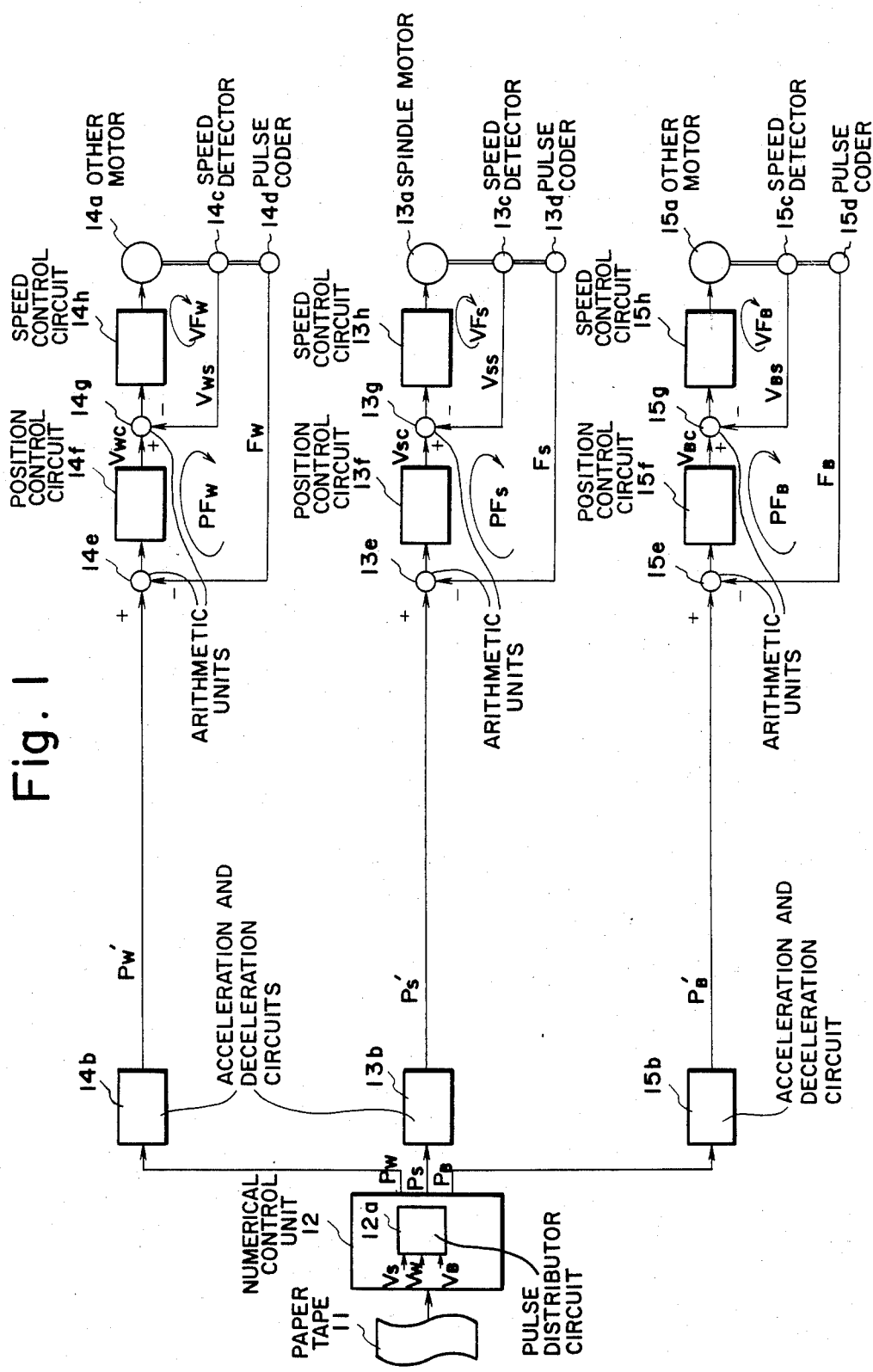
FIG. 1 is a block diagram of a system according to a first embodiment of the present invention.

As shown in FIG. 1, a tape 11 of paper (hereinafter referred to as an "NC tape") has NC command data punch therein. A numerical control unit 12 includes a pulse distributor circuit 12a. Designated at 13a is a spindle motor and at 14a, 15a are other motors to be controlled to rotate in synchronism with rotation of the spindle motor 13a. Acceleration and deceleration circuits 13b, 14b, 15b generate as command pulses trains of pulses PS', PW', PB' which are obtained by accelerating the pulse speed of distributed pulses PS, PW, PB generated by the pulse distributor circuit 12a at their leading edges and decelerating the pulse speed thereof at thier trailing edges. Speed detectors 13c, 14c, 15c such as tachometer generators produce actual-speed voltages VSS, VWS, VBS dependent on the speeds of rotation of the motors 13a, 14a, 15a, respectively. Pulse coders 13d, 14d, 15d generate feedback pulses FS, FW, FB each time the motors 13a, 14a, 15a rotate through predetermined angles. Arithmetic circuits 13e, 14e, 15e serve to calculate the differences between the command pulses PS', PW=, PB' and the feedback pulses FS, FW, FB. Position control circuits 13f, 14f, 15f have, though not shown, error registers for storing data on the differences between the numbers of the command pulses and the numbers of the feedback pulses, and digital-to-analog converters for generating analog voltages as speed command voltages VSC, VWC, VBC proportional to the contents of the registers. The differences between the speed command voltages VSC, VWC, VBC and the actual-speed voltages VSS, VWS, VBS are calculated by arithmetic circuits 13g, 14g, 15g, respectively. Designated at 13h, 14h, 15h are speed control circuits, PFS, PFW, PFB position feedback loops, and VFS, VFW, VFB speed feedback loops.

Operation of the control system shown in FIG. 1 will now be described.

When the NC tape 11 supplies a command to rotate the spindle motor 13a, the motor 14a, and the motor 15a at speeds VS, VW, VB, respectively, for synchronous operation, the numerical control unit 12 delivers digital values VS, VW, VB to the pulse distributor circuit 12a. Although not shown, the pulse distributor cituict 12a has pulse distributors for the motors 13a, 14a, 15a, respectively, for effecting an arithmetic operation for pulse distribution or linear interpolation. In case the pulse distributors are composed of known DDAs (digital differential analyzers), each pulse distributor comprises a register for setting therein one of the speed commands VS, VW, VB, an accumulator, and an adder for adding the speed command set in the register to the content of the accumulator each time clock pulses of a constant frequence F are generated. Overflow pulses form the accumulators serve as the distributed pulses PS, PW, PB. The pulse speeds of the distributed pulses PS, PW, PB are expressed respectively as follows:

VS·F/2n, VW F/2n, VB·F/2n where n is the number of bits for the accumulators. By selecting the pulse speed F of the clock pusles to be:

F=2n (c/s)

the pulse speeds of the distributed pulses are given by VS, VW, VB, respectively.

Since the distributed pulses are derived from the same clock pulses, the distributed pulses are kept in synchronism. When the speed commands VS, VW, VB are supplied from the numerical control unit 12 and set into the pulse distributor circuit 12a, the latter will produce the synchronized distributed pulses PS, PW, PB having the speed commands. The distributed pulses PS, PW, PB are supplied to the acceleration and deceleration circuits 13b, 14b, 15b for accelerating and decelerating the pulse speeds exponentially or linearly, and are generated therby as the command pulses PS', PW', PB', respectively. The command pulses PS', PW', PB' are stored through the arithmetic circtuis 13e, 14e, 15e respectively into the non-illustrated error registers in the position control circuits 13f, 14f, 15f. As a result, the speed command voltages are generated from the digital-to-analog converters in the position control circuits 13f, 14f, 15f. The spindle motor 13c, and the motors 14a, 15a now start rotating with a predtermined time delay. The speed detectors 13c, 14c, 15c generate the actual-speed voltages VSS, VWS, VBS, respectively, and the pulse coders 13d, 14d, 15d generate the feedback pulses FS, FW, FB each time the motors rotate through predtermined angles, thus substracting from the contents of the error registers in the position control circuits 13f, 14f, 15f. Therefore, the position feedback loops PFS, PFW, PFB effect positional control to zero positional errors (differences between the command pulses and the feedback pulses). Then, the contents of the error registers in the positional control circuits are converted into analog signals which are delivered as speed command voltages. The differences between the speed command voltages adn the actual-speed voltages are calculated by the arithmetic circuits 13g, 14g, 15g, and the motors are controlled for rotation by the speed control circuits 13h, 14h, 15h so that the speed differences will fall to zero. Thus, the speed feedback loops VFS, VFW, VFB carry out speed control to zero the speed differences. Thereafter, the motors 13a, 14a, 15a reach a certain speed after a certain interval of time. In such a normal operating condition, the contents (offsets) of the error registers in the position control circuits 13f, 14f, 15f are kept constant. Consequently, the speed command voltgages VSC, VWC, VBC are kept constant, and the speed differences are also maintained at constant values.

With the arrangement of the first embodiment shown in FIG. 1, the motors are synchronously rotated properly at commanded speeds by the distributed pulses having predetermined pulse speeds and generated by the pulse distributor circuit from the same clock pulses. The position feedback loop as well as the speed feedback loop being added to the system for controlling rotation of the spindle and the workpiece, speed control is rendered possible which is highly speed-responsive, an arrangement that has an increased speed restoring capability to bring the actual speeds of the motors into conformity with the commanded speeds within a short period of time when the actual speeds have varied from the commanded speeds due to a variation in the load imposed on the motors.

Figure 2:
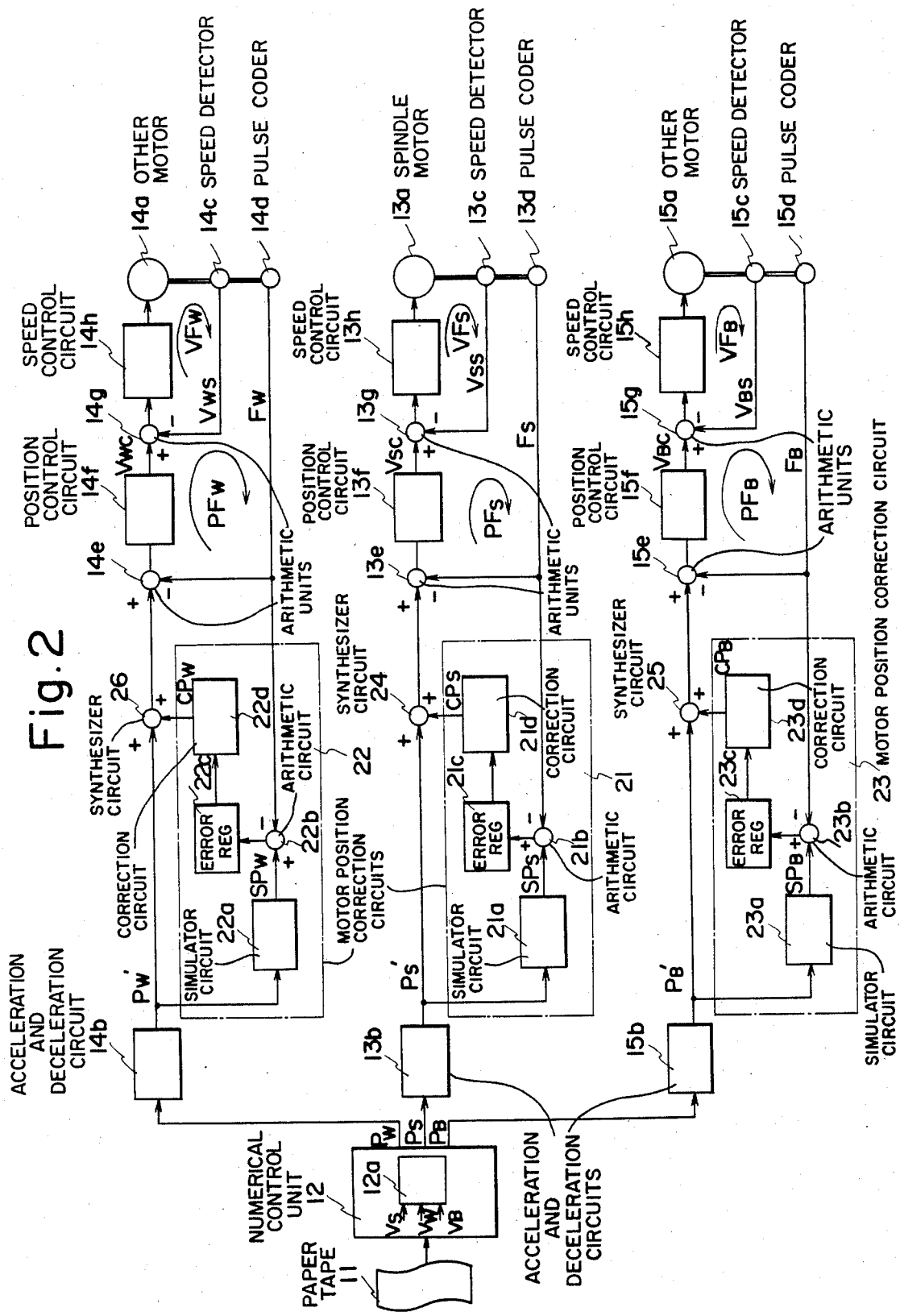
FIG. 2 is a block diagram of a system according to a second embodiment of the present invention.

FIG. 2 shows in block form a motor control system according to a second embodiment of the present invention. Identical parts in FIG. 2 are denoted by identical reference characters in FIG. 1, and their detailed description will not be given.

The system illustrated in FIG. 2 includes motor position correcting circuits 21 through 23 comprising simulator circuits 21a, 22a, 23a, respectively, for simulating servo system characteristics, arithmetic circuits 21b, 22b, 23b, respectively, for calculating the differences between output pulses SPS, SPW, SPB from the simulator circuits and feedback pulses FS, FW, FB, error registers 21c, 22c, 23c, respectively, for storing data on the calculated differences, and correction circuits 21d, 22d, 23d, respectively, for generating positive or negative correction pulses CPS, CPW, CPB to zero the differences or errors when the latter are stored in the error registers 21c through 23c. Designated at 24 through 26 are synthesizer circutis for combining command pulses PS', PW', PB' with the correction pulses CPS, CPW, CPB. The simulator circuits 21a, 22a, 23a are simulative of the characteristics of a servo system including position feedback loops PFS, PFW, PFB and speed feedback loops VFS, VFW, VFB. Where the servo system has a first order time lag, simulator circuits 21a, 22a, 23a are of the same construction as that of acceleration and deceleration circuits 13b, 14b, 15b. More specifically, the simulator circuits are composed of synthesizer circuits for combining command pulses PS', PW', PB' from the acceleration and deceleration circuits 13b, 14b, 15b with output pulses SPW, SPS, SPB from accumulators, registers for storing pulses supplied from the synthesizer circuits, registers, and adders for adding the contents E of the registers to the content of the accumulators each time a pulse P having a constant speed Fc is generated and for setting the results of addition into the accumulators. Assuming that the speed of the command pulses PS', PW', PB' is F and the speed of the output pulses SPW, SPS, SPB is Fo, the following equations are established:

$$\frac{dE}{dt} = F - Fo \qquad (1)$$

$$Fo = \frac{Fc}{2^n} \cdot E \qquad (2)$$

where n is the number of bits for the accumulators. The equation (1) is indicative of an increase in contentd of the registers per unit time, and the equation (2) is indicative of the number of carry pulses (output pulses SPW, SPS, SPB) which the accumulators produce per unit time. The speed Fo of the output pulses can be derived from the equations (1), (2) as follows:

$$Fo = F[1 - exp(-kT)] \qquad (3)$$

where k is a constant.

The output pulses SPW, SPS, SPB thus have a first order time lag in that they are accelerated exponentially when the motors are started, and decelerated exponentially when the motors are stopped. With the simulator circuits 21a, 22a, 23a being simulative of the servo system characteristics, the contents of the error registers 21c, 22c, 23c are substantially nil as long as the servo system operates properly. Where the servo system malfunctions, or the motor speed is reduced due to an increased load, the error registers 21c-23c have contents other than zero. At this time, the correction circuits 21d, 22c, 23d produce correction pulses CPS, CPW, CPB to zero the contents of the error registers 21c-23c. According to the embodiment shown in FIG. 2, the position correcting circuits 21-23 are added which function to rotate the motors synchronously at more exact command speeds than those obtained by the arrangement of FIG. 1.

Figure 3:
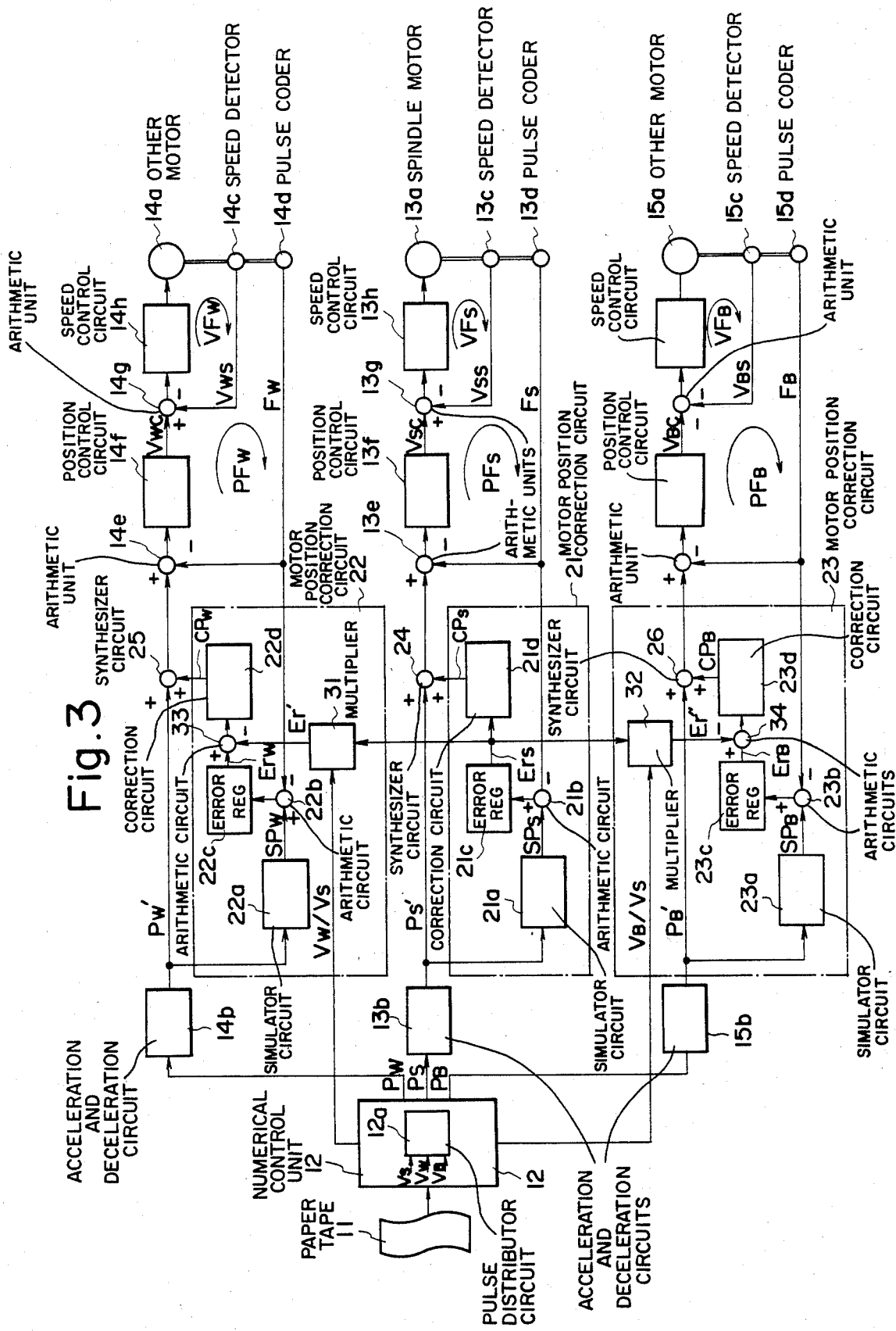
FIG. 3 is a block diagram of a system according to a third embodiment of the present invention.

FIG. 3 is a block diagram of a system according to a third embodiment of the present invention. Identical parts in FIG. 3 are denoted by identical reference characters shown in FIG. 2.

The system of FIG. 3 includes a pair of multipliers 31, 32. The multiplier 31 is supplied with a content Ers of an error register 21c in a position correcting circuit 21 provided for a reference motor or spindle motor 13a and also with a command speed ratio VW/VC between command speeds for the motors 14a, 13a. The multiplier 32 is suppied with a content Ers of the error register 21c and with a command speed ratio VB/VC between command speeds for the motors 15a, 13a. The multipliers 31, 32 multiply their input signals and produce results of multiplication as follows:

$$Er' = Ers \cdot VW/VC, \quad Er'' = Ers \cdot VB/VC$$

Arithmetic circuits 33, 34 serve to add contents ErW, ErB of error registers 22c, 23c respectively to the outputs Er', Er'' from the multipliers 31, 32.

In the system of FIG. 3, when the speed of the spindle motor 13a varies in response to a variation in the load, the content of the error register 21c becomes other than zero. As a result, the multipliers 31, 32 produce the values Er', Er'' proportional to the content Ers of the error register 21c and to the speed ratios VW/VC, VB/VC. The values Er', Er'' are subtracted from the contents of the error registers 22c, 23c for the motors 14a, 15a, respectively. Dependent on the results of subtraction, the correction circuits 22d, 23d produce correction pulses CPW, CPB which are combined with command pulses PW', PB' by the arithmetic circutis 25, 26.

The arrangement of FIG. 3 is more advantageous than the arrangement shown in FIG. 2 in that the speeds of rotation of the motors 14a, 15a become larger or smaller as the speed of rotation of the spindle motor 13a is increased or reduced, thus maintaining the motors 14a, 15a in synchronism with the spindle motor 13a.

Figure 4:
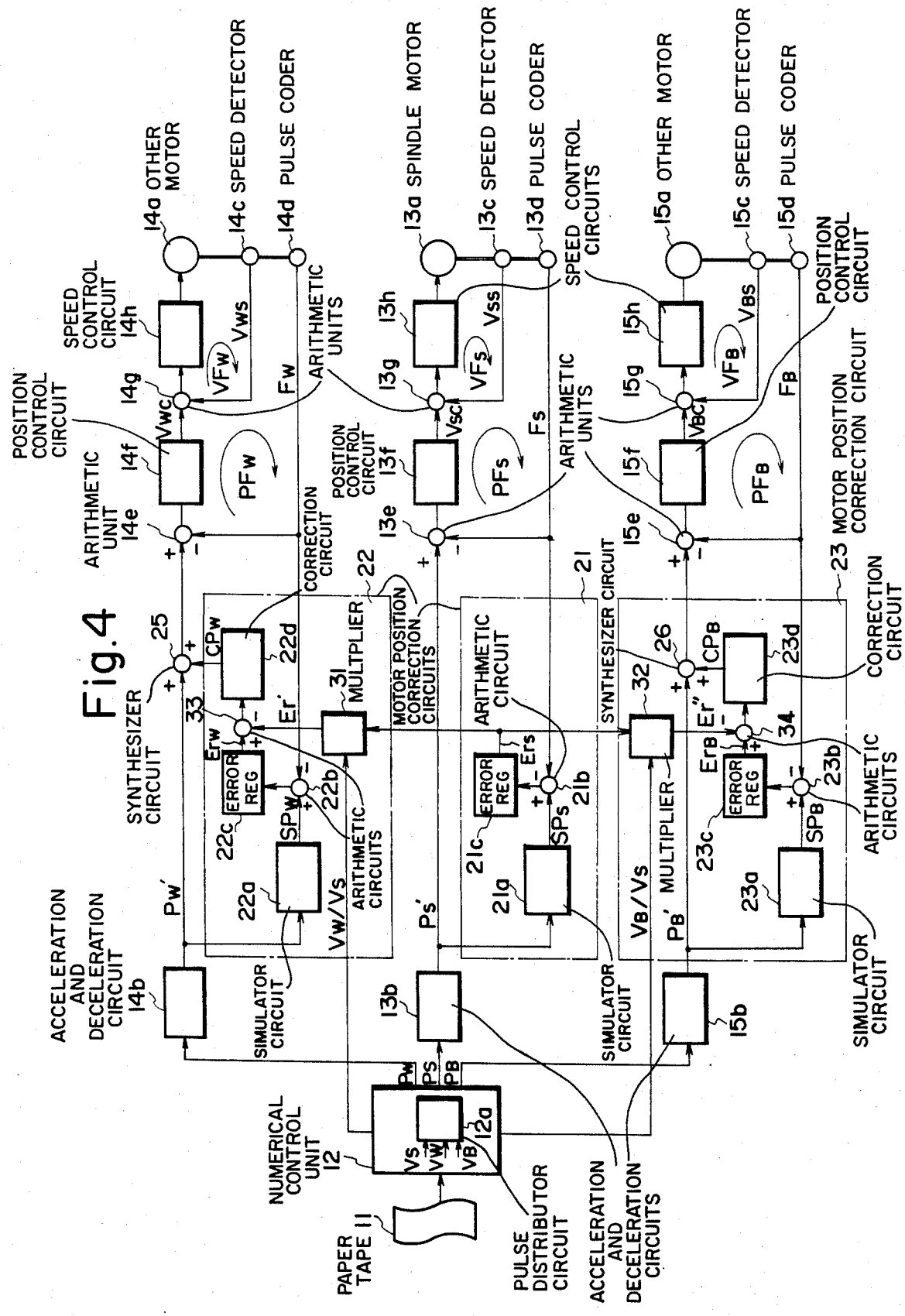
FIG. 4 is a block diagram of a system according to a fourth embodiment of the present invention.

FIG. 4 shows in block form a system according to a fourth embodiment of the present invention. Identical parts shown in FIG. 4 are denoted by identical reference characters illustrated in FIG. 3. The system of FIG. 4 is different from that of FIG. 3 in that the position correcting circuit 21 provided for the reference servo system (for the spindle motor 13a) has no correction circuit 21d and no arithmetic circuit 24.

With the arrangement shown in FIG. 4, when the speed of rotation of the spindle motor 13a varies due to a load variation to thereby render the content of the error register 21 nonzero, no positional correction is effected with respect to the servo system for the spindle motor 13a, and positional correction is carried out for the servo systems for the motors 14a, 15a to be rotated in synchronism with the spindle motor 13a.

According to the present invention, as described above, positional control loops are added to speed control loops, and the speeds of rotation of motors are controlled by pulses obtained by pulse distribution. This arrangement enables the motors to be rotated exactly at commanded speeds under highly speed-responsive control for the correct synchronous operation of the motors. The servo systems have respective simulator circuits for producing correction pulses to more reduce the differences between the actual speeds and command speeds of the motors, so that the motors can more effectively be controlled for synchronous operation. Furthermore, there are provided circuits for controlling the speeds of rotation of the controlled motors in response to the speed of rotation of the spindle motor for bringing the controlled motors into complete synchronization with the spindle motor.

Although certain preferred embodiments have been shown and described in detail, it should be understood that many changes and modifications may be made therein without departing from the scope of the appended claims.

What we claim is:

1. A system for controlling motors including a reference motor, such that the motors rotate at command speeds in synchronism and have respective rotational positions, said system comprising:

numerical control means, operatively connected to receive commanded speeds of rotation, for generating as positional commands synchronized distributed pulse trains having frequencies corresponding to the commanded speeds of rotation for respective ones of the motors;

positional control feedback circuits, operatively connected to respective ones of said motors and to receive respective ones of said positional command pulse trains, for producing speed command outputs in accordance with respective ones of said positional command pulse trains and said respective rotational positions;

speed control feedback circuits, operatively connected between respective ones of said positional control feedback circuits and respective ones of said motors, for controlling the speed of the motors based on said speed command outputs and said speeds of rotation of the motors;

detector means, operatively connected to said respective ones of the motors, for generating feedback pulses corresponding to the rotational positions of the respective motors each time the respective motors rotate through a predetermined angular interval and for applying these signals to said position control feedback circuits as said respective rotational positions;

simulator circuit means, operatively connected to receive respective ones of said positional command pulse trains, for simulating the characteristics of respective positional and speed control feedback in combination with corresponding ones of said motors, and for generating pulses responsive to said simulations; and correction circuit means, operatively connected to said corresponding ones of said motors, to said positional and said speed control feedback circuits and to said simulator circuit means, for correcting the rotational positions of the motors in response to differences between the feedback pulses and the pulses generated by said simulator circuit means.

2. A system according to claim 1, said positional control feedback circuits having detectors for generating feedback pulses each time the motors rotate through predetermined angular intervals, further including simulator circuits provided respectively for the motors for being supplied with said trains of distributed pulses and for simulating the characteristics of the servo loops, error registers provided respectively for the motors for storing the differences between the numbers of the feedback pulses and the numbers of pulses generated by said simulator circuits, correction circuits provided respectively for the motors for generating position correcting pulses in response to the contents of said error registers, and synchronism correcting means provided respectively for the motors except said reference motor for producing outputs in response to a ratio of the speed of rotation of the reference motor to the speed of rotation of the other motors and to the content of the error register for the reference motor.

3. A system according to claim 1, said positional control feedback circuits having detectors for generating feedback pulses as said signals indicative of the positions of the motors each time the motors rotate through predetermined angular intervals, further including simulator circuits provided respectively for the motors for being supplied with said trains of distributed pulses and for simulating the characteristics of the servo loops, error registers provided respectively for the motors for storing the differences between the numbers of the feedback pulses and the numbers of pulses generated by said simulator circuits, correction circuits provided respectively for the motors except the reference motor for generating position correcting pulses in response to the contents of said error registers, and synchronism correcting means provided respectively for the motors except said reference motor for producing outputs in response to a ratio of the speed of rotation of the reference motor to the speed of rotation of the other motors and to the content of the error register for the reference motor, to thereby correct the positions of the other motors based on the outputs from said synchronism correcting means.

* * * * *